United States Patent [19]

Fubini et al.

[11] Patent Number: 4,785,280

[45] Date of Patent: Nov. 15, 1988

[54] SYSTEM FOR MONITORING AND INDICATING ACOUSTICALLY THE OPERATING CONDITIONS OF A MOTOR VEHICLE

[75] Inventors: Enrica Fubini; Antonio De Bono, both of Turin; Giacomo Ruspa, Vinovo, all of Italy

[73] Assignee: Fiat Auto S.p.A., Turin, Italy

[21] Appl. No.: 7,693

[22] Filed: Jan. 28, 1987

[30] Foreign Application Priority Data

Jan. 28, 1986 [IT] Italy ................ 67069 A/86

[51] Int. Cl.$^4$ .............................................. B60G 5/00
[52] U.S. Cl. .................... 340/52 F; 340/384 E; 340/328
[58] Field of Search ............. 340/52 F, 62, 384 E, 340/329, 521, 328, 692

[56] References Cited

U.S. PATENT DOCUMENTS

| | | | |
|---|---|---|---|
| 2,337,788 | 12/1943 | White ............................. | 340/62 |
| 2,802,197 | 8/1957 | Weiss ............................. | 340/62 |
| 3,922,672 | 11/1975 | Birt et al. .................... | 340/384 E |
| 4,015,237 | 3/1977 | Takatani et al. .............. | 340/52 F |
| 4,072,925 | 2/1978 | Yashima et al. .............. | 340/52 F |
| 4,224,613 | 9/1980 | Kaiser et al. ................ | 340/384 E X |
| 4,393,365 | 7/1983 | Kondo et al. ................. | 340/52 F X |
| 4,503,528 | 3/1985 | Nojiri et al. ................. | 340/52 F X |
| 4,555,690 | 11/1985 | Fukushima et al. ........... | 340/52 F |

FOREIGN PATENT DOCUMENTS 2756750  6/1979  Fed. Rep. of Germany .... 340/52 F

Primary Examiner—Joseph A. Orsino, Jr.
Assistant Examiner—Brian R. Tumm
Attorney, Agent, or Firm—Sughrue, Mion, Zinn, Macpeak & Seas

[57] ABSTRACT

The system includes a plurality of sensor devices each arranged to monitor a respective physical or operating magnitude of apparatus, a device or a member of the vehicle, and to provide corresponding electrical signals. An acoustic signal generator provides a plurality of acoustic characterizing signals, indicative of corresponding predetermined operating conditions, and a plurality of acoustic level signals indicative of corresponding predetermined levels of importance attributable to the operating conditions. A processing unit detects on the basis of signals provided by the sensor devices the operating conditions of the vehicle and attaches in a predetermined manner, a level of importance to each operating condition identified, and supplies to the acoustic signal generator electrical control signals for causing the output of an acoustic signal comprising, in succession, the level signal and the characterizing signal associated with the operating condition detected.

8 Claims, 1 Drawing Sheet

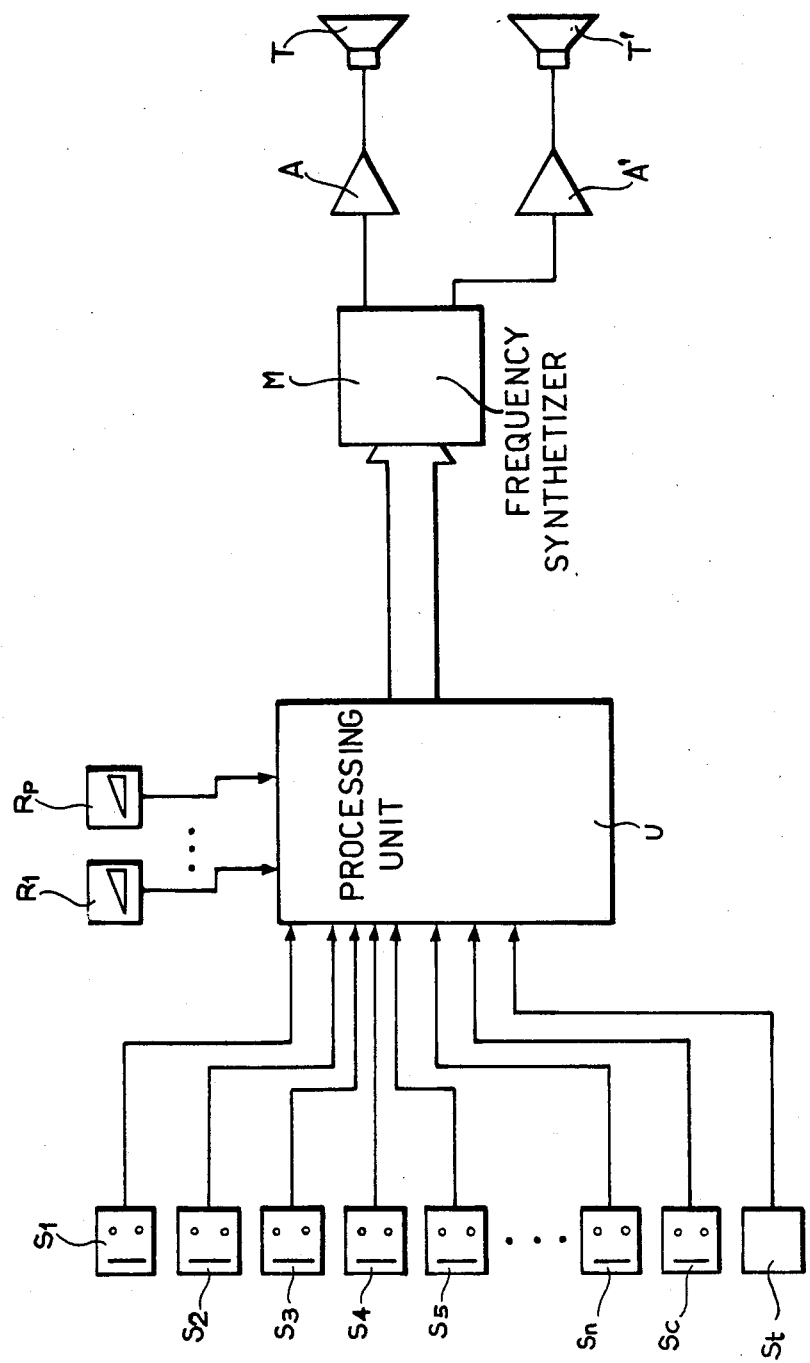

SYSTEM FOR MONITORING AND INDICATING ACOUSTICALLY THE OPERATING CONDITIONS OF A MOTOR VEHICLE

BACKGROUND OF THE INVENTION

The present invention relates to a system for monitoring and indicating acoustically operating conditions of a motor vehicle. By the term "operating conditions" is meant magnitudes or situations relative to the conditions or operation of the vehicle, such as, for example, the fuel level, the pressure and level of the lubricating oil, the level of the liquid in the braking circuit, the position of the vehicle doors, the state of charge of the battery, the tire pressures, etc. By operating conditions, there is also meant situations in which it may be necessary or opportune to carry out certain maneuvers, such as, for example, switching on or off of the headlights, changing to a higher or lower gear, etc.

SUMMARY OF THE INVENTION

The object of the invention is to provide an improved monitoring and acoustic indicating system which is able to provide the user with immediate information about the operating conditions of the motor vehicle which is readily perceptible.

This object is achieved according to the invention by means of a system characterised in that it comprises:

a plurality of sensor devices each arranged to monitor a respective physical or operating magnitude of apparatus, a device or a member of the vehicle, and to provide corresponding electrical signals, acoustic signal generator means for generating a plurality of acoustic characterising signals, each indicative of a corresponding predetermined operating condition of a predetermined plurality of operating conditions, and a plurality of acoustic level signals indicative of corresponding predetermined levels of importance or seriousness attributable to the operating conditions, and processing means connected to the sensor devices and to the acoustic signal generator means, the processing means being arranged;

to detect on the basis of signals provided by the sensor devices the occurrence of the operating conditions of the vehicle, to attach in a predetermined manner a predetermined level of seriousness or importance to each operatin condition, and to supply to the acoustic signal generator means electrical control signals for causing the output of an acoustic signal comprising, in succession, the level signal and the characterising signal associated with the operating condition detected at any time.

According to a further characteristic of the invention, the acoustic signal generator means are conveniently arranged to generate characterising signals of an imitative type.

Furthermore, if at least one sensor device is arranged to detect a predetermined magnitude which is adjustable by means of a manual control (for example, the temperature or the air flow in the heating or ventilating system) and to provide corresponding signals to the processing means, the acoustic signal generator means are correspondingly controlled to generate a characterising signal having a predetermined characteristic which is variable in a manner corresponding to the variations detected in the adjustable magnitude.

BRIEF DESCRIPTION OF THE DRAWINGS

Further characteristics and advantages of the system according to the invention will become apparent from the detailed description which follows, given with reference to the appended drawing, provided purely by way of non-limiting example. The drawing is a block schematic diagram of one manner of realisation of the system of the invention.

DETAILED DESCRIPTION OF THE INVENTION

With reference to the drawing, a system according to the invention comprises a plurality of sensors, indicated $S_1-S_n$, which control n physical or operating magnitudes of apparatus, a device or a member of the vehicle. These sensors are of the threshold type and output a two-state signal. For example, these sensors may be a sensor for the fuel level, a sensor for the lubricating oil pressure, a sensor for the level of the lubricating oil, sensors for sensing whether the doors of the motor vehicle are open or closed, tire pressure sensors, a sensor of the level of liquid in the braking system, a sensor of the coolant temperature, a sensor for the oil temperature, a sensor of the state of charge of the battery of the motor vehicle, a sensor for detecting the condition of the engine during running, a sensor for detecting the condition of the vehicle during running, etc. The sensors S are connected to respective inputs of an electronic processing and control unit U made, for example, with the use of a microprocessor. This unit may include, in known manner, a central processing unit, read-only memories for the programs, and random access memories for the data.

The unit U is also connected to a plurality of other sensors, indicated $R_1-R_p$. The sensors are associated with manually operated controls for regulating adjustable magnitudes, such as the rate of flow of air in the passenger compartment, etc. The sensors $R_1-R_p$ may be of analogue type (for example, potentiometers) or digital type (encoders) and can supply electrical signals indicative of the magnitude and direction (increasing or decreasing) of the adjustment carried out by the user.

The processing unit U is connected to a known type of frequency synthesiser M able to generate n separate acoustic signals, the "characterising" signals, each of which corresponds to one of the n operating conditions monitored by the sensors $S_1-S_n$. These characterising signals have predetermined acoustic characteristics. Preferably, for a better understanding and quicker recognition of these characterising signals, the latter may be of the type which imitate or evoke the phenomenon which they are indicating. Thus, for example, the acoustic signal characterising insufficient air pressure in the tyres could be a sound reproducing the rustling or hissing typically heard when a punctured tyre deflates.

The synthesiser M is also able to generate p acoustic characterising signals each of which has a respective characteristic (for example, intensity, amplitude, pulsation, etc) which is variable. These acoustic characterising signals are associated with the adjustments "monitored" by the sensors $R_1-R_p$. In operation, when the user operates a manual control for altering one of the p adjustable mangitudes which are associated with the sensors $R_1-R_p$, the processing unit U outputs corresponding control signals to the synthesiser M. If the user has caused an increasing variation in the adjustable magnitude, the unit U provides control signals to the synthesiser M such as to cause a corresponding increasing variation in the variable characteristic or characteristics of the characterising signal associated with the magnitude in question. Thus, for example, each time the user adjusts the ventilation air flow in the sense of increasing the air flow into the passenger compartment, the synthesiser controlled by the processing unit U may emit, for example, a sound having an increasing intensity and/or pitch.

By means of the sensors $R_1$ and $R_p$, the synthesiser M, and the suitably programmed processing unit U, it is thus possible to achieve a sort of acoustic feedback for the adjustable magnitudes.

The synthesiser M pilots an electroacoustic transducer T, for example a loudspeaker, through amplifying and piloting circuits A.

Conveniently, the indicating system of the invention is able to attach, for example, a predetermined one of three different levels or degrees of importance or seriousness to each of the n operating conditions monitored by the sensors $S_1$–$S_n$. These three levels may be defined, for example, as an information level, an alert level and an alarm level, in order of importance or increasing seriousness.

The processing unit U may easily be programmed to attach a particular level of importance or seriousness to each of the operating conditions which it can recognise on the basis of information provided by the sensors $S_1$–$S_n$ according to a predetermined scheme. Moreover, the synthesiser M is able to generate at least three acoustic signals, each of which is associated with one of the three levels of importance or seriousness described above.

In operation, when the unit U detects the occurrence of a predetermined operating condition, it provides the synthesiser M with control signals to cause the output of an acoustic signal comprising, in succession, the level-of-importance signal and the characterising signal associated with the operating condition detected. The user therefore receives an acoustic signal which first informs him of the level of seriousness and importance of the operating condition occurring and then informs him about the precise nature of the operating condition in question.

The unit U may be programmed to review the outputs of the sensors $S_1$–$S_n$ in the starting phase of the vehicle to carry out a check or inspection of the operational state of the vehicle. The unit U is also programmed to interrogate the sensors $S_1$–$S_n$ and the sensors $R_1$–$R_p$ cyclically during running of the motor vehicle to indicate any operating anomalies to the user in the manner described above.

The system according to the invention allows the user of a motor vehicle to be provided with information which is easily recognisable without distracting his attention from the road, as occurs with optical-type indicator devices.

In addition to the sensors $S_1$–$S_n$ described above, the system may include a further sensor $S_c$ connected to the unit U and associated with the manual control for the horn of the motor vehicle, and a tachometric sensor $S_t$ arranged to supply the unit U with electrical signals indicative of the speed of the vehicle. The unit U may be arranged correspondingly to pilot (through the synthesiser M and further piloting and amplifying circuits A') a second electroacoustic transducer T' mounted outside the passenger compartment of the motor vehicle so that, when the control for the horn is operated, the acoustic signal generated by T' has a characteristic (for example intensity of frequency) which is variable in dependence on the speed of the motor vehicle according to a predetermined law, previously stored in the memories of the unit U.

We claim:

1. A system for monitoring and indicating acoustically the operating conditions of a motor vehicle, comprising:

a plurality of sensor devices, each arranged to monitor a respective physical or operating magnitude of apparatus, a device or a member of the vehicle, and to provide corresponding electrical signals, acoustic signal generator means for generating a plurality of acoustic characterising signals, each indicative of a corresponding predetermined operating condition of a predetermined plurality of operating conditions, and a plurality of acoustic level signals indicative of corresponding predetermined levels of importance or seriousness attributable to the operating conditions, and processing means connected to the sensor devices and the acoustic signal generator means and arranged:

to detect on the basis of signals provided by the sensor devices the occurrence of the operating conditions of the vehicle, to attach in a predetermined manner a predetermined level of seriousness or importance to each operating condition, and to supply to the acoustic signal generator means electrical control signals for causing the output of an acoustic signal comprising, in succession, the acoustic level signal and the acoustic characterising signal associated with the operating condition detected at any time.

2. A system according to claim 1, wherein the acoustic signal generator means are arranged to generate characterising signals of an imitative type.

3. A system according to claim 1 or claim 2, wherein at least one sensor device is arranged to detect a predetermined magnitude adjustable by means of a manual control and to provide corresponding signals to the processing means, the generator means being correspondingly arranged to generate at least one characterising signal having at least one predetermined characteristic variable in a manner corresponding to the variations detected in the adjustable magnitude.

4. A system according to claim 3, wherein the generator means are arranged to generate at least one characterising signal having an intensity variable in a manner corresponding to the variations in the adjustable magnitude.

5. A system according to claim 3, wherein the generator means are arranged to generate at least one characterising signal having an amplitude variable in a manner corresponding to the variations in the adjustable magnitude.

6. A system according to claim 3, wherein the generator means are arranged to generate at least one characterising signal having a pulsation variable in a manner corresponding to the variations in the adjustable magnitude.

7. A system according to claim 1, wherein the acoustic signal generator means comprise a synthesiser.

8. A system according to claim 1, wherein said sensor devices include a sensor device for detecting the operating conditions of the manual control of the horn of the motor vehicle, and a sensor device for sensing the velocity of the motor vehicle connected to the processing means: the processing means being arranged to activate the acoustic signal generator means so as to generate an acoustic signal outside the passenger compartment, having a characteristic which is variable in dependence on the speed of the vehicle each time the control device for the horn is operated.

* * * * *